US012798951B2

(12) United States Patent
Keefe et al.

(10) Patent No.: US 12,798,951 B2
(45) Date of Patent: Nov. 17, 2026

(54) SYSTEM, APPARATUS, AND METHOD FOR DISPENSING MATERIAL

(71) Applicants: William Lee Sunghoon Keefe, North Chesterfield, VA (US); Stephen Lee Keefe, North Chesterfield, VA (US)

(72) Inventors: William Lee Sunghoon Keefe, North Chesterfield, VA (US); Stephen Lee Keefe, North Chesterfield, VA (US)

( * ) Notice: Subject to any disclaimer, the term of this patent is extended or adjusted under 35 U.S.C. 154(b) by 154 days.

(21) Appl. No.: 18/916,218

(22) Filed: Oct. 15, 2024

(65) Prior Publication Data

US 2026/0103374 A1 Apr. 16, 2026

(51) Int. Cl.
*B67D 1/08* (2006.01)
*A23G 9/28* (2006.01)

(52) U.S. Cl.
CPC ......... *B67D 1/0878* (2013.01); *B67D 1/0888* (2013.01); *A23G 9/28* (2013.01)

(58) Field of Classification Search
CPC ....... B67D 1/0882; B67D 1/0878; A23G 3/50
See application file for complete search history.

(56) References Cited

U.S. PATENT DOCUMENTS

| | | | | |
|---|---|---|---|---|
| 7,843,317 | B2 * | 11/2010 | Angell | G06K 7/0008 340/10.5 |
| 8,151,832 | B1 * | 4/2012 | Dorney | G07F 9/001 141/94 |
| 10,575,536 | B2 * | 3/2020 | Briganti | A23G 3/566 |
| 11,084,707 | B2 * | 8/2021 | Wade | B67D 1/0888 |
| 11,812,889 | B2 | 11/2023 | Lavie | |
| 2013/0049934 | A1 * | 2/2013 | Baym | G06K 19/02 235/375 |
| 2014/0234500 | A1 * | 8/2014 | Mitchell | B41F 17/001 426/302 |

* cited by examiner

*Primary Examiner* — Timothy L Maust
(74) *Attorney, Agent, or Firm* — Keefe IP Law, PLLC

(57) ABSTRACT

A method is disclosed. The method includes disposing a marking on an interior surface of a container, reading the marking using an electronic reader, dispensing a material into the container after the electronic reader reads the marking, and altering the marking, by dispensing the material into the container, so that the marking is unreadable by the electronic reader.

17 Claims, 6 Drawing Sheets

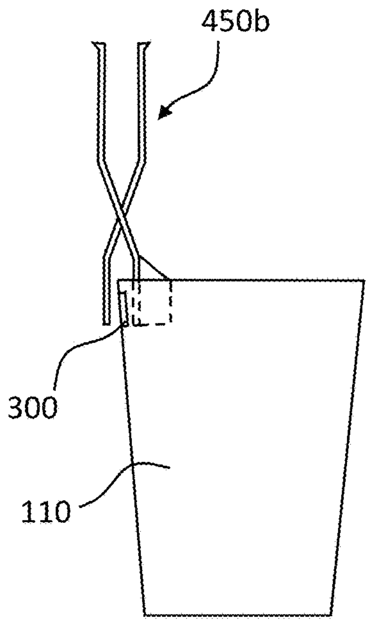
Fig. 5
300a
Fig. 6A
300b
Fig. 6B
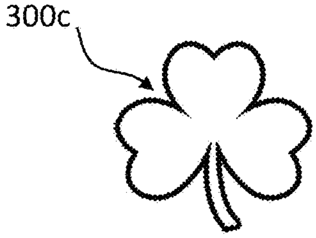
Fig. 6C
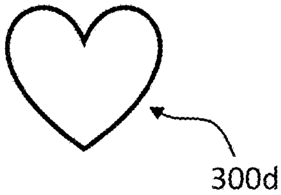
Fig. 6D
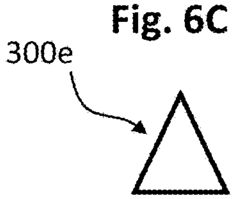
Fig. 6E
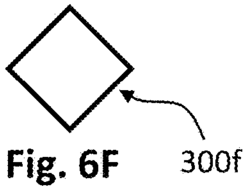
Fig. 6F
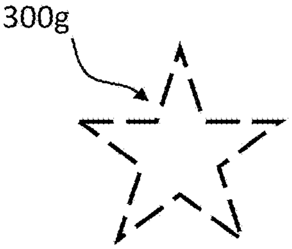
Fig. 6G
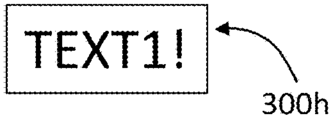
Fig. 6H
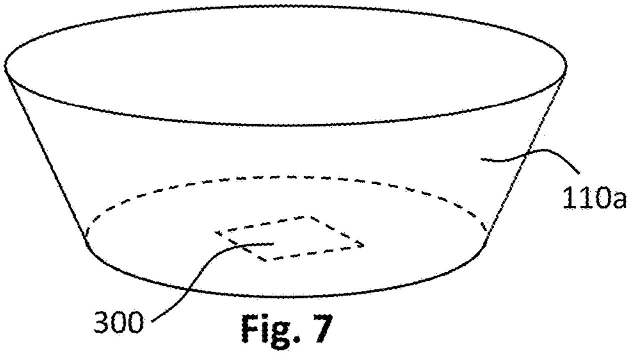
Fig. 7
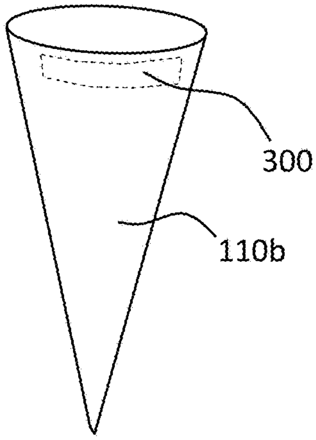
Fig. 8

SYSTEM, APPARATUS, AND METHOD FOR DISPENSING MATERIAL

TECHNICAL FIELD

The present disclosure generally relates to a system, apparatus, and method for dispensing, and more particularly to a system, apparatus, and method for dispensing material.

BACKGROUND

Food such as beverages are often provided using self-serve dispensers such as beverage fountains and similar dispensers. Consumers are often provided with a container such as a cup when making purchases, and then are free to fill the container with food such as a beverage or any other edible substance that has been purchased. Such self-serve dispensers are widely used, for example at many food courts, fast food restaurants, and cafeterias.

Having consumers fill containers on their own removes a significant time and effort burden from food providers who provide food to end users. However, in removing this time and effort burden, food providers typically lose effective control of dispensing of food by consumers. For example in many situations, a user may obtain many free refills of food using the same container, effectively gaining more food than was purchased. Users may utilize a single purchased container so that multiple users may consume an amount of food significantly in excess of the amount of one container. Further, end users may reuse a food container bought on a previous occasion on multiple occasions, thereby obtaining free refills for an extended time period following an original purchase. Many other imaginative tactics may be used by end users to obtain free refills. Food providers thereby may lose a substantial amount of edible material and thereby a significant amount of money due to such widespread end user behavior.

Further, free refills may lead to negative health effects for consumers, particularly among younger users who may obtain excessive amounts of sugary, caloric, and/or other unhealthy foods based on free refills. This may be particularly relevant in settings such as school cafeterias.

Food providers can attempt to use monitoring and enforcement of dispensing rules to prevent the above tactics by end users to obtain additional food after purchase of a single container. However, such conventional monitoring and enforcement can involve a significant time and effort burden to food providers, as well as monetary burden if devices such as cameras are employed. Often, the time, effort, and monetary burden of monitoring refills can approach or exceed the time, effort, and monetary burden of allowing free refills, making such conventional monitoring efforts pointless or counterproductive. Further, such monitoring efforts may evoke negative reactions from end users, who may resent such restrictive measures and may consider avoiding a given food provider in favor of competitors who do not use such monitoring. This may cause that food provider to lose customers. Further, such monitoring efforts may lead to confrontations between food providers and end users over accusations of free refills, which may cause further loss of customers and also undue stress on food provider employees who may be put into difficult and even dangerous situations of confronting end users with perceived allegations of theft. Such situations may easily escalate into undesired, heated situations that food providers wish to avoid.

As a result of this overall situation, many food providers opt for providing free refills without restriction, and treat the loss of food to free refills as a cost of doing business. Accordingly, a need in the art exists for controlling food dispensing by end users in a way that is efficient and without provoking confrontational situations.

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to a method. The method includes disposing a marking on an interior surface of a container, reading the marking using an electronic reader, dispensing a material into the container after the electronic reader reads the marking, and altering the marking, by dispensing the material into the container, so that the marking is unreadable by the electronic reader.

In another aspect, the present disclosure is directed to an apparatus for controlling dispensing a food from a food dispenser into a food container having an edible marking disposed on an interior surface of the food container. The apparatus includes an electronic reader configured to read the edible marking, and a controller. The controller is configured to control the electronic reader, control the food dispenser to dispense the food into the food container after the electronic reader reads the edible marking, control the food dispenser to stop dispensing of the food when a predetermined period of time elapses after the electronic reader reads the edible marking, and block the food dispenser from dispensing the food outside of the predetermined period.

BRIEF DESCRIPTION OF THE DRAWINGS

FIG. 5 is a side view of at least some exemplary embodiments of the present invention;

FIG. 6A is a top view of at least some exemplary embodiments of the present invention;

FIG. 6B is a top view of at least some exemplary embodiments of the present invention;

FIG. 6C is a top view of at least some exemplary embodiments of the present invention;

FIG. 6D is a top view of at least some exemplary embodiments of the present invention;

FIG. 6E is a top view of at least some exemplary embodiments of the present invention;

FIG. 6F is a top view of at least some exemplary embodiments of the present invention;

FIG. 6G is a top view of at least some exemplary embodiments of the present invention;

FIG. 6H is a top view of at least some exemplary embodiments of the present invention;

FIG. 7 is a perspective view of at least some exemplary embodiments of the present invention;

FIG. 8 is a perspective view of at least some exemplary embodiments of the present invention;

DETAILED DESCRIPTION AND INDUSTRIAL APPLICABILITY

Figure 1:
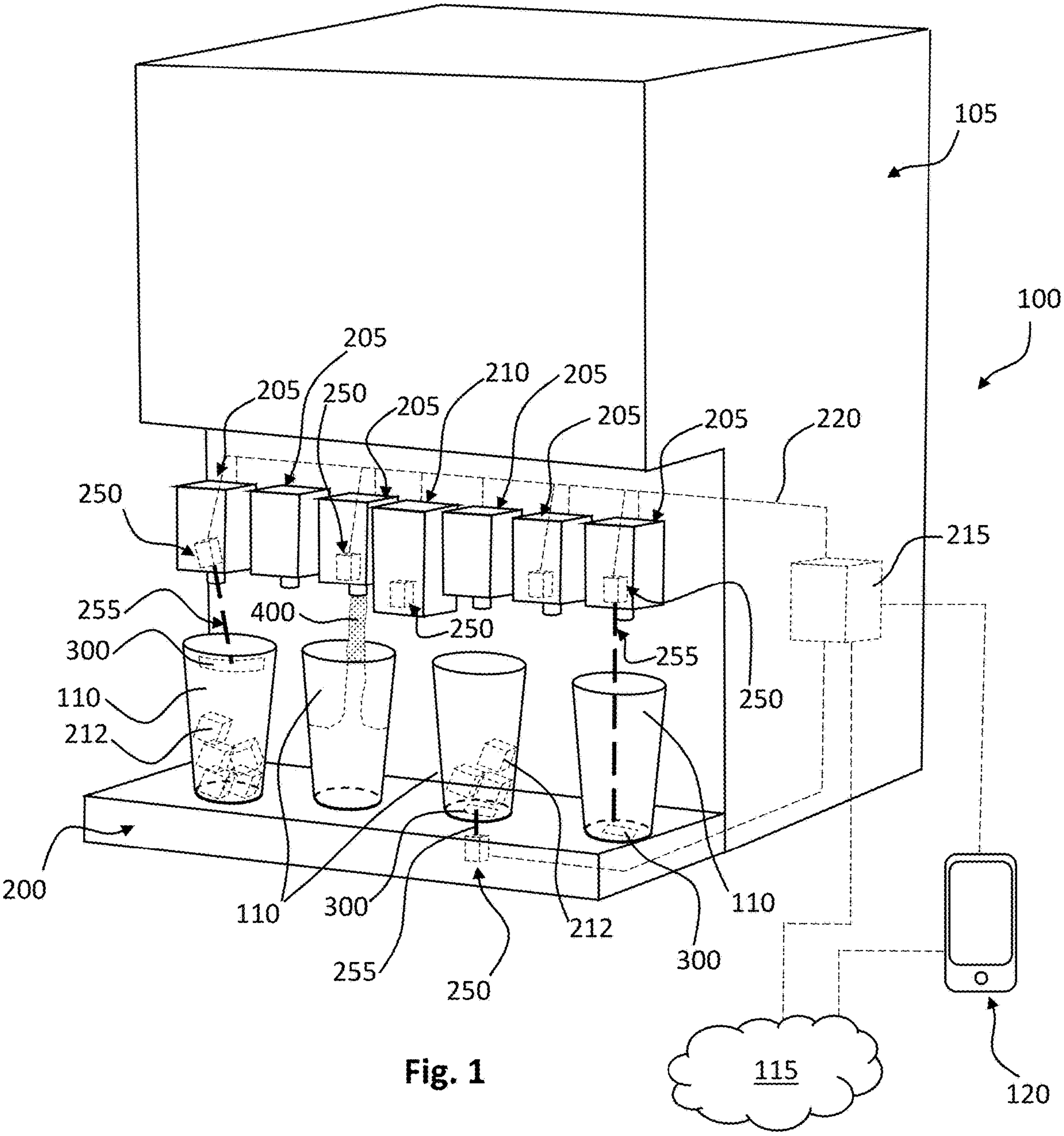
FIG. 1 is perspective view of at least some exemplary embodiments of the present invention.

FIG. 1 illustrates an exemplary embodiment of the exemplary disclosed system, apparatus, and method. Dispensing system 100 may include a dispensing apparatus 105 that may dispense a material 400 into one or more containers 110. Dispensing apparatus 105 may communicate with a network 115. Dispensing system 100 may also communicate with one or more user devices 120 either directly or via network 115.

User device 120 may be any suitable device for interfacing with other components of dispensing system 100 such as a computing device (e.g., including a user interface). For example, user device 120 may be any suitable user interface for receiving input and/or providing output to a user. User device 120 may include a camera and a microphone. User device 120 may be, for example, a touchscreen device (e.g., of a smartphone, a tablet, a smartboard, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of dispensing system 100, and/or any other suitable user interface. For example, user device 120 may include a touchscreen device of a smartphone or handheld tablet. For example, user device 120 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. An application and/or module for example as described herein and/or a web browser may be installed on user device 120 and utilized by a user of user device 120.

Network 115 may be any suitable communication network over which data may be transferred between components of dispensing system 100. Network 115 may be the internet, a LAN (e.g., via Ethernet LAN), a WAN, a WiFi network, or any other suitable network. The components of dispensing system 100 may also be directly connected (e.g., by wire, cable, USB connection, and/or any other suitable electro-mechanical connection) to each other and/or connected via network 115. For example, components of dispensing system 100 may wirelessly transmit data by any suitable technique such as, e.g., wirelessly transmitting data via 4G LTE networks (e.g., or 5G networks) or any other suitable data transmission technique for example via network communication. Components of dispensing system 100 may include any suitable communication components (e.g., integrally formed communication devices) for communicating with other components of dispensing system 100 using for example the communication techniques described herein.

Dispensing system 100 may include one or modules for performing the exemplary disclosed operations. The one or more modules may be stored and operated by any suitable components of dispensing system 100 (e.g., including processor components) such as, for example, network 115, a controller of dispensing apparatus 105, and/or one or more user devices 120. For example, dispensing system 100 may include one or more modules having computer-executable code stored in non-volatile memory. Dispensing system 100 may also include one or more storages (e.g., buffer storages). For example, the exemplary disclosed buffer storage may include storage medium and RAM. The exemplary disclosed buffer storage may be implemented in software and/or a fixed memory location in hardware of dispensing system 100. The exemplary disclosed buffer storage (e.g., a data buffer) may store data temporarily during an operation of dispensing system 100.

Dispensing apparatus 105 may be any suitable device or assembly for dispensing material 400. Material 400 may be edible material and/or non-edible material. Material 400 may be food such as, for example, a beverage, ice cream, yogurt, custard, pudding, soup, shave ice, and/or any other suitable dispensable food. Material 400 may be a beverage such as, for example, a soft drink, beer, wine, sparkling wine, a distilled alcoholic beverage, a mixed alcoholic beverage, a frozen beverage, a coffee beverage, a milkshake, juice, lemonade, milk, tea, hot chocolate, coconut water, an energy drink, sparkling water, and/or any other suitable dispensable beverage. Material 400 may include ice shavings and/or ice cubes. In at least some exemplary embodiments, dispensing apparatus 105 may be a beverage fountain, an ice cream dispenser, a frozen beverage dispenser, and/or any other similar type of food dispenser. Material 400 may be non-edible material such as cleaning products. For example, material 400 may include laundry detergent, hand sanitizer, liquid soap, and/or similar materials. Dispensing apparatus 105 may dispense material 400 that may be fuel (e.g., gasoline or diesel), paint and/or other coating material, chemicals, and/or similar material. Material 400 may be any suitable liquid or fluid (e.g., or partially liquid or fluid) edible or non-edible material. Dispensing apparatus 105 may dispense material 400 that may be medicine (e.g., prescription and/or over-the counter drugs), Dispensing apparatus 105 may include a dispensing shelf 200 that may be disposed beneath one or more dispensers 205. Dispensing apparatus 105 may include a plurality of dispensers 205 such as, for example, between one and ten or more dispensers 205, between two and eight dispensers 205 (e.g., six dispensers 205), or any other desired number of dispensers 205. In at least some exemplary embodiments, dispensing apparatus 105 may include one or more ice dispensers 210 that may dispense ice 212 (e.g., ice cubes, ice shavings, crushed ice, and/or any other desired frozen water or material). In at least some exemplary embodiments, an ice dispenser may be integrated into one or more dispensers 205. Dispensing apparatus 105 may include a controller 215. Controller 215 may control an operation of one or more dispensers 205 and/or one or more ice dispensers 210.

Controller 215 may include a processor (e.g., microprocessing logic control device) or board components. Controller 215 may control one or more dispensers 205 and/or ice dispenser 210 based on input data and/or commands (e.g., control commands) received via the exemplary disclosed user interfaces (e.g., described herein) of dispensers 205 and/or ice dispenser 210, via user device 120, and/or via network 115. For example, controller 215 may be a programmable apparatus or computing device including one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Controller 215 may include a computer-readable storage medium, and this medium may be internal or external, removable and replaceable, or fixed. Controller 215 may include a Basic Input/Output System (BIOS), firmware, an operating system, a database, or the like that can include, interface with, or support the modules, software, and/or hardware described herein. Controller 215 may be electrically connected to one or more dispensers 205 and/or ice dispensers 210 via one or more electrical connectors 220 (e.g., electrical lines, wires, or cables that may transfer electricity, data, and/or electrical signals). Additionally or alternatively, controller 215 may communicate with dispensers 205 and/or ice dispensers 210 via any of the exemplary disclosed communication techniques (e.g., wireless communication techniques).

Figure 2:
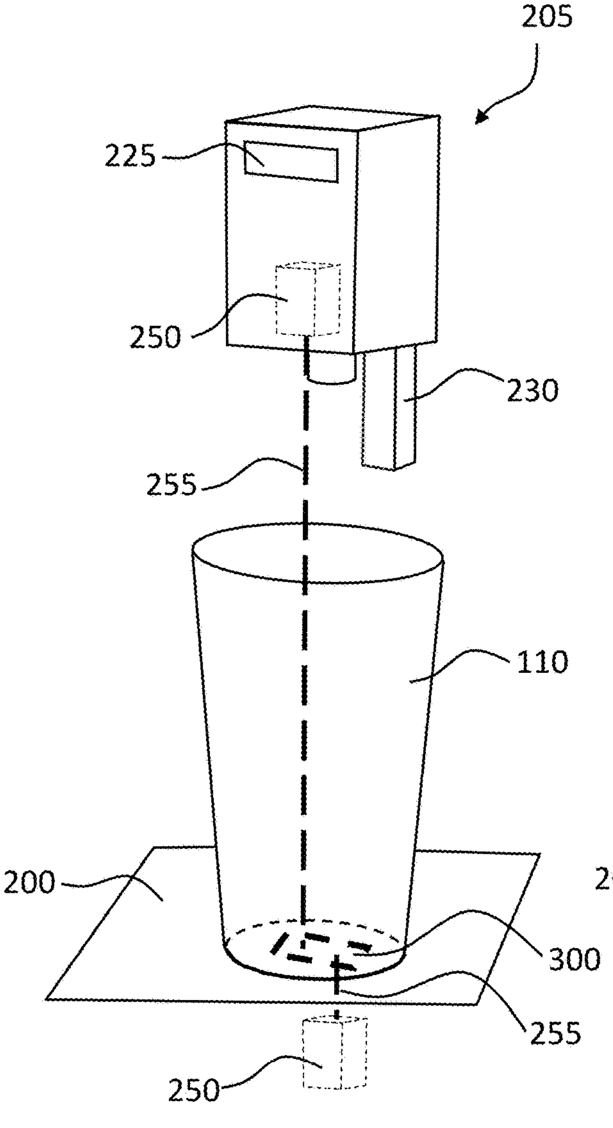
FIG. 2 is a perspective view of at least some exemplary embodiments of the present invention.
Figure 3:
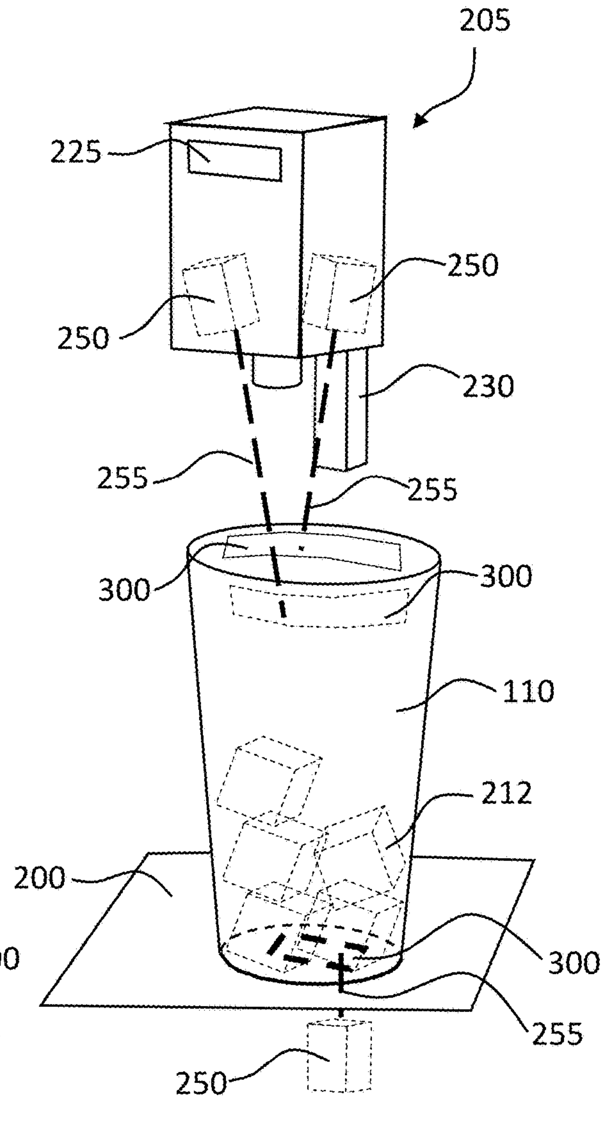
FIG. 3 is a perspective view of at least some exemplary embodiments of the present invention.

Dispenser 205 may be any suitable dispenser for dispensing material 400. Dispenser 205 may be fluidly connected with any suitable pressurized source and may operate with any suitable pressurized reservoir of material to be dispensed. In at least some exemplary embodiments, dispenser 205 may be connected to an external carbonator system and/or include an internal carbonator system including for example a pressurized source (e.g., pressurized $CO_2$ or any other suitable pressurized source). Dispenser 205 may include any suitable valves for selectively allowing flow of pressurized material (e.g., material 400) through and out of dispenser 205. For example, dispenser 205 may include a manual valve assembly or an automated valve assembly (e.g., electrical valve) such as a check valve, ball valve, lever valve assembly, spigot, faucet, and/or any other suitable valve assembly. For example as illustrated in FIGS. 2 and 3, dispenser 205 may include a user interface 225 for selectively controlling dispensing flow out of dispenser 205 through an automated valve assembly (e.g., electrical valve assembly). User interface 225 may include a push button, dial, touchscreen interface or display, and/or any other suitable interface device. Also for example, dispenser 205 may include a mechanical member 230 such as a lever (e.g., an actuating lever) for actuating a valve assembly of dispenser 205 to selectively open and close flow through dispenser 205. In at least some exemplary embodiments, the exemplary disclosed valve assembly may be electrically connected to controller 215 via electrical connector 220 and/or via the exemplary disclosed communication techniques and controlled by controller 215. Controller 215 may control the exemplary disclosed valve assembly to selectively allow or block dispensing of material 400 through dispenser 205. Controller 215 may also control the exemplary disclosed valve assembly to selectively unlock or lock mechanical member 230 to thereby effectively allow or block dispensing of material 400 through dispenser 205.

An electronic reader 250 may be integrated into dispenser 205, be attached to dispenser 205, or be attached to dispensing apparatus 105 at a location near dispenser 205. Electronic reader 250 may be any suitable reader for reading the exemplary disclosed marking described herein. Electronic reader 250 may be a QR code scanner, a barcode scanner, an image recognition device (e.g., a device for identifying images or characters such as an OCR device), and/or any other suitable device for reading a marking. Electronic reader 250 may be an image scanner, a laser scanner, a CCD barcode scanner, a 2D area imager, a slot scanner, and/or any other suitable type of scanner. Electronic reader 250 may be an infrared scanner such as an infrared diode laser scanner or a near-infrared light scanner. Electronic reader 250 may be any suitable reader, imaging device, or scanner for recognizing and/or reading a marking on container 110. Electronic reader 250 may be electrically connected to controller 215 via electrical connector 220 to communicate with, be controlled by, and/or provide data or signals to controller 215.

Electronic reader 250 may emit a beam 255 that may be any suitable laser, beam, light, and/or other suitable type of radiation and/or emission. Beam 255 may be reflected from the exemplary disclosed marker back to electronic reader 250, where it may be captured by any suitable sensor (e.g., light sensor, laser sensor, lens, photodetector, and/or any other suitable reader component) of electronic reader 250. Electronic reader 250 may thereby sense and read information (e.g., data) of the exemplary disclosed marking and transfer data and/or signals indicative of the exemplary disclosed marking to controller 215 via electrical connector 220 and/or via the exemplary disclosed communication techniques.

Electronic reader 250 may be any suitable imaging device such as a camera. For example, electronic reader 250 may be any suitable video camera such as a digital video camera, a webcam, and/or any other suitable camera for recording visual data (e.g., recording a video or taking pictures) and/or image recognition. Electronic reader 250 may be a 2D and/or 3D camera. Electronic reader 250 may be a spatial computing device (e.g., a spatial computer). Electronic reader 250 may be for example a two-dimensional and/or three-dimensional video sensor or camera for recognizing the exemplary disclosed marking. In at least some exemplary embodiments, electronic reader 250 may be a stereoscopic camera and/or any other suitable device for stereo photography, stereo videography, and/or stereoscopic vision. Electronic reader 250 may include one or more actuators that may adjust a position of electronic reader 250 based on an operation of dispensing system 100. The actuators may be for example one or more external actuators disposed at an exterior of electronic reader 250 and/or one or more integrated actuators that are substantially completely or partially integrated into electronic reader 250 (e.g., disposed and/or integrated within an interior of electronic reader 250). In at least some exemplary embodiments, the actuators may be internally integrated into electronic reader 250 and may turn optical components and/or move lenses of electronic reader 250 within a housing of electronic reader 250 to zoom in and out at different features or points (e.g., of the exemplary disclosed marking) within a variable field of view of electronic reader 250. The actuator may also be one or more external and/or internally-integrated mechanical actuators configured to mechanically turn electronic reader 250 and move lenses of electronic reader 250 to focus in and out at desired objects (e.g., the exemplary disclosed marking). Dispensing system 100 may also include an image recognition module that may perform feature detection and matching to allow for matching and comparison of features (e.g., the exemplary disclosed marking) imaged by electronic reader 250. For example, electronic reader 250 may find predetermined features that may correspond to two-dimensional surfaces and/or contours (e.g., or three-dimensional features) of the exemplary disclosed marking within a field of view of electronic reader 250. Also for example, any suitable technique may be used to identify features (e.g., spatial data) of a viewed object (e.g., the exemplary disclosed marking) and to match those imaged features to predetermined features provided by dispensing system 100 (e.g., or provided by a user). Also for example, optical character recognition of text and/or markings located on a viewed object (e.g., the exemplary disclosed marking) may be performed. For example, spatial data and/or other data may be determined that may be matched to predetermined data provided by dispensing system 100 (e.g., predetermined shapes, colors, text, contours, and other features). For example, the spatial data and/or other data may include data defining points (e.g., or contours) of a user and/or accessory based on an actual image of an object (e.g., the exemplary disclosed marking) imaged by electronic reader 250. For example, spatial and/or data based on viewing an object may be used to match that data to predetermined data to identify points or features of an object (e.g., the exemplary disclosed marking) being viewed. Any suitable techniques for recognizing objects and/or determining spatial and/or other data of a viewed object may be utilized by dispensing system 100 for image recognition via electronic reader 250.

One or more electronic readers 250 may be disposed and/or located in any suitable configuration. For example as illustrated in FIGS. 1 and 2, electronic reader 250 may be disposed to emit beam 255 substantially vertically (e.g., emit beam 255 downward) from above container 110. Also for example as illustrated in FIGS. 1 and 3, electronic reader 250 may be disposed at or near dispenser 205 to emit beam 255 from above container 110 at an angle. Also for example as illustrated in FIGS. 1, 2, and 3, electronic reader 250 may be disposed at or in dispensing shelf 200 to emit beam 255 from below container 110. One or more electronic readers may thereby read exemplary disclosed markers disposed at various portions of container 110 via one or more beams 255 such as, for example, beam 255 emitted downward from above container 110, beam 255 emitted at an angle from above container 110, and/or beam 255 emitted upward (e.g., substantially vertically and/or at an angle) from below container 110.

Ice dispenser 210 may be generally similar to dispenser 205. Ice dispenser 210 may be connected to, communicate with, and be controlled by controller 215 similarly to as described above regarding dispenser 205. Ice dispenser 210 may or may not include and/or operate with electronic readers 250 similar to as described above regarding dispenser 205.

Container 110 may be any suitable container for being received on dispensing shelf 200 under dispenser 205 and/or ice dispenser 210 (e.g., or under dispenser 205 and/or ice dispenser 210 without dispensing shelf 200) and receiving the exemplary disclosed material (e.g., material 400) dispensed from dispenser 205 and/or ice dispenser 210. Container 110 may be a cup, bowl, plate, dish, jar, tank, drum, or any other suitable type of container (e.g., vessel, receptacle, reservoir, or any other suitable container). In at least some exemplary embodiments, container 110 may be formed from non-edible container material. Container 110 may be formed from plastic, paper, metal, fabric, flexible container material (e.g., a flexible sack or bag), composite material, wood, and/or any other suitable material for holding the exemplary disclosed material dispensed from dispenser 205 and/or ice dispenser 210. In at least some exemplary embodiments, container 110 may be formed from polyethylene, polylactic acid (PLA), high-density polyethylene (HDPE), polycarbonate, polypropylene, vinyl, polystyrene, bioplastic, closed-cell extruded polystyrene foam, polyethylene terephthalate (PET), and/or polyvinyl material (e.g., polyvinyl chloride). Container 110 may include or be formed from metal material such as steel (e.g., stainless steel), aluminum, pewter, precious metals (e.g., silver, gold, copper, and/or any other desired precious metal), iron and/or any other suitable metal and/or alloy. Container 110 may be formed from ceramic material, porcelain material, or enamel material. Container 110 may be formed from glass material such as borosilicate glass, tempered glass, annealed glass, and/or any other suitable structural glass material. Container 110 may be formed from any suitable combination of the exemplary disclosed container materials. Container 110 may be formed from transparent (e.g., exemplary disclosed plastic and/or glass) and/or opaque material. For example, container 110 may include a transparent bottom and an opaque body. In at least some exemplary embodiments, container 110 may be formed from exemplary disclosed glass and/or plastic container material that may be transparent (e.g., and/or translucent). In at least some exemplary embodiments, container 110 may be formed from paper container material that may be coated with plastic and/or wax.

In at least some exemplary embodiments, container 110 may be formed from edible container material (e.g., food and/or non-toxic material). For example, container 110 may be formed from baked material including brown and/or white sugar, flour (e.g., cake, white, pastry, soy, tapioca, rye, graham, bread, rice, oat, corn, wheat, and/or any other suitable type of flour), salt, eggs, butter, milk, cinnamon, vanilla, molasses, vegetable shortening, hydrocolloids, oat fiber, and/or any other suitable material for baking. For example, container 110 may be a sugar cone, a cake cone, or a waffle cone. Container 110 may be a cup or bowl of any desired type such as, for example, bread, cookie, cheese, bacon, tortilla, veggie, chocolate, and/or any other desired type of cup, bowl, or other suitable type of container. In at least some exemplary embodiments, container 110 may be an edible cup or bowl including sugar and/or hydrocolloids.

As described further below, container 110 may be marked with a marking 300. Marking 300 may be formed from edible marking material (e.g., marking material that may be safe and suitable to be eaten, drunk, and/or ingested). For example, marking 300 may be formed from food and/or non-toxic (e.g., food-safe) marking material such as natural dye marking material, food-safe pigments, and/or any other suitable edible marking material. Marking 300 may be formed from edible marking material such as, for example, vegetable dyes, chocolate, candy, humectants, powdered sugar mixed with a liquid (e.g., cream, milk, lemon juice, liqueur, and/or any other suitable liquid), chlorophyll, glycerin, citric acid, carotenoids, natural color dye marking material (e.g., including vegetables), turmeric powder, saffron, cochineal, inorganic pigments, and/or any other suitable marking material. Marking 300 may be formed from edible marking material similar to the exemplary disclosed marking material to be dispensed, which can dry in place to form marking 300 (e.g., in at least some exemplary embodiments, marking 300 may be formed from marking material that may be a curable or dried form of the exemplary disclosed marking material to be dispensed from dispensing apparatus 105). In at least some exemplary embodiments, marking 300 may be edible ink including marking material such as, for example, purified water, propylene glycol, coloring (e.g., any suitable red, blue, yellow, and/or other colored dye marking materials), sodium benzoate, citric acid, methyl paraben, propyl paraben, and/or any other suitable marking material.

Marking 300 may be formed from non-edible marking material. Marking 300 may be formed from marking material including any suitable ink such as, for example, acrylic ink, metallic ink, fabric ink, alcohol ink, iron gall ink, UV curable ink, acid ink, and/or any other suitable type of ink. Marking 300 may be formed from any suitable water soluble or liquid soluble material. Marking 300 may be formed from marking material including pigments mixed with oil or water. Marking 300 may be formed from marking material including water, any suitable surface-active agent, and inorganic dye. Marking 300 may be formed from marking material including polypropylene.

Marking 300 may be formed from marking material that may be either visible or substantially invisible to (e.g., and/or relatively difficult to see with) the human eye. For example, marking 300 may be formed from exemplary disclosed marking material described above that may be substantially clear and/or transparent (e.g., lacking color and/or dye marking material). Also for example, marking 300 may be formed from marking material having a substantially same or similar color to a color of container 110 (e.g., so that it may be difficult to see by a user of dispensing system 100). Also for example, marking 300 may be formed from marking material that is colored or dyed (e.g., and/or of a color contrasting with a color of container 110) so that it may be relatively conspicuous or apparent to a user of dispensing system 100. In at least some exemplary embodiments, marking 300 may be formed from marking material including fluorescent material and/or phosphors (e.g., fluorescent and/or glow-in-the-dark material).

Figure 4A:
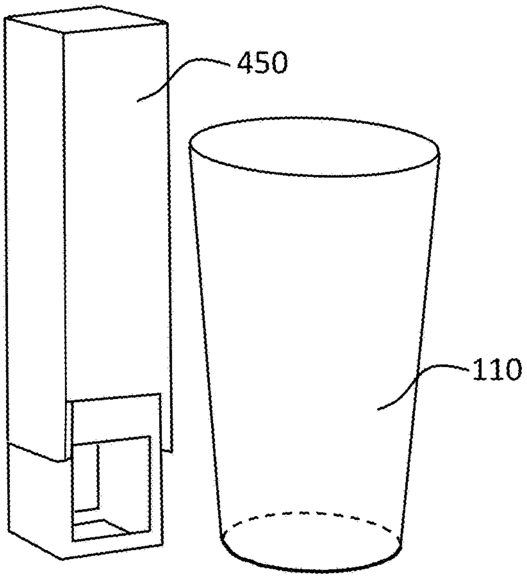
FIG. 4A is a perspective view of at least some exemplary embodiments of the present invention.
Figure 4B:
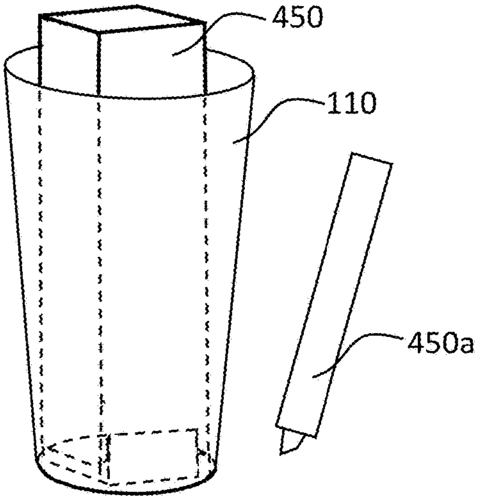
FIG. 4B is a perspective view of at least some exemplary embodiments of the present invention.
Figure 4C:
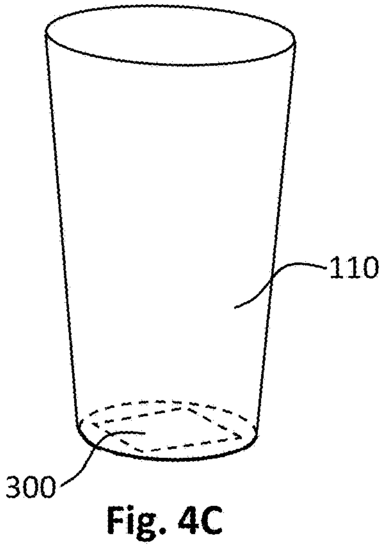
FIG. 4C is a perspective view of at least some exemplary embodiments of the present invention.
Figure 4D:
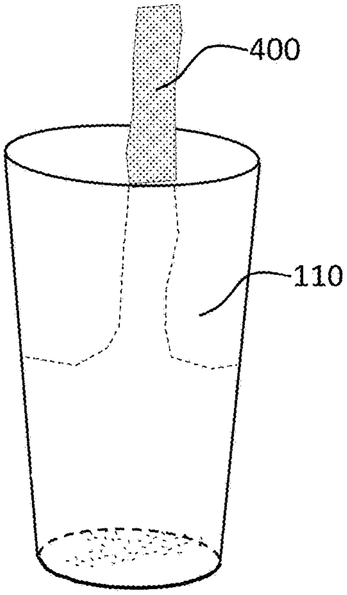
FIG. 4D is a perspective view of at least some exemplary embodiments of the present invention.
Figure 4E:
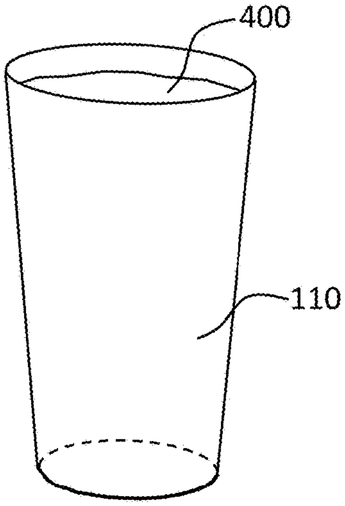
FIG. 4E is a perspective view of at least some exemplary embodiments of the present invention.

Marking 300 may be formed from any suitable marking material that may be altered when, after being marked on an interior surface of container 110 (e.g., as illustrated in FIGS. 1-3 and 4C), material 400 is dispensed into container 110 (e.g., as illustrated in FIG. 4D). For example as further described below, marking material 300 may be marked on an interior surface of container 110 in a wet or partially wet (e.g., moist) state and may be dried (e.g., may dry or cure) on an interior surface of container 110 (e.g., or may be marked in a dry state). For example, marking material of marking 300 may be an exemplary disclosed edible or non-edible ink that may be marked in a wet or partially wet (e.g., moist) state on an interior surface of container 110 (e.g., or may be marked in a dry state). Marking 300 may be formed from any suitable exemplary disclosed marking material that may be water or liquid soluble. Marking 300 may be formed from any suitable marking material that may be altered when material 400 is dispensed into container 110 (e.g., as illustrated in FIG. 4D), in which the exemplary disclosed altering by material 400 may include material 400 dissolving marking 300 (e.g., erasing marking 300), disturbing a pattern of marking 300, removing some or substantially all of marking 300, and/or any other suitable altering of marking 300. For example, marking 300 may be formed from any suitable marking material that may be altered when material 400 is dispensed into container 110 so that marking 300 becomes unreadable and/or unrecognizable by electronic reader 250. For example, marking 300 may be formed from any suitable exemplary disclosed marking material that may be marked on an interior surface of container 110 so that marking 300 may be readable and/or recognizable by electronic reader 250 before material 400 is dispensed into container 110, and unreadable and/or unrecognizable by electronic reader 250 after material 400 is dispensed into container 110 and alters marking 300. Material 400 may alter marking 300 based on contacting marking 300 for example as illustrated in FIG. 4D. Material 400 may alter marking material of marking 300 as soon as material 400 comes into contact with marking 300 (e.g., once enough material 400 is dispensed into container 110 to reach or contact marking 300). For example, when marking 300 is disposed at a bottom interior surface of container 110, then marking 300 may be altered as soon as (e.g., almost as soon as) material 400 is dispensed (e.g., as illustrated in FIGS. 4C and 4D). Also for example, when marking 300 is disposed at a side interior surface of container 110 (e.g., as illustrated in FIGS. 1, 3, and 5), then marking 300 may be altered as soon as (e.g., almost as soon as) enough material 400 is dispensed to fill container 110 to a level of marking 300 (e.g., contacting and/or covering marking 300).

As illustrated in FIGS. 6A through 6H, marking 300 may be any suitable marking that may be recognized or read by electronic reader 250 when in an unaltered state. Marking 300 may be unrecognizable or unreadable by electronic reader 250 when altered to be in an altered state as described herein (e.g., when and/or after material 400 is dispensed as illustrated in FIG. 4D). For example, marking 300*a* may be a two-dimensional barcode such as a QR code that may be scanned by electronic reader 250 when marking 300*a* is in an unaltered state as illustrated in FIG. 6A, and that may be unreadable (e.g., unscannable) by electronic reader 250 when in an altered state (e.g., as illustrated in FIG. 4D). Also for example, marking 300*b* may be a barcode that may be scanned by electronic reader 250 when marking 300*b* is in an unaltered state as illustrated in FIG. 6B, and that may be unreadable (e.g., unscannable) by electronic reader 250 when in an altered state (e.g., as illustrated in FIG. 4D). Also for example, marking 300 may be any desired shape (e.g., marking 300*c* that may be a shamrock as illustrated in FIG. 6C, marking 300*d* that may be a heart as illustrated in FIG. 6D, marking 300*e* that may be a triangle as illustrated in FIG. 6E, marking 300*f* that may be a diamond as illustrated in FIG. 6F, and/or any other desired shape) that may be recognized by electronic reader 250 when the exemplary disclosed markings are in an unaltered state as illustrated in FIGS. 6C through 6F, and that may be unrecognizable (e.g., or determined to be altered) by electronic reader 250 when in an altered state (e.g., as illustrated in FIG. 4D). Also for example, marking 300 may be any desired shape formed by broken or dashed lines (regular or irregular broken or dashed lines and/or dots) that may include a portion of any desired shape (e.g., marking 300*g* as illustrated in FIG. 6G). For example, marking 300*g* may be a marking that has had portions affected or removed by dispensing of ice 212 prior to dispensing of material 400. Marking 300*g* may thereby be still recognizable by electronic reader 250 after being affected by ice 212 as illustrated in FIG. 6G (e.g., but before material 400 is dispensed). In at least some exemplary embodiments, marking 300*g* may be scanned or recognized by electronic reader 250 disposed under container 110 for example as illustrated in FIG. 2 and described above. Also for example, marking 300*h* may include characters (e.g., text, numbers, special characters, and/or any other suitable characters) that may be recognized by electronic reader 250 (e.g., using optical character recognition for example as described above) when marking 300*h* is in an unaltered state as illustrated in FIG. 6H, and that may be unrecognizable (e.g., unreadable) by electronic reader 250 when in an altered state (e.g., as illustrated in FIG. 4D). The exemplary disclosed markings may be of any desired color that may be recognized by electronic reader 250. The exemplary disclosed markings may have contours (e.g., three-dimensional contours) that may be recognized by electronic reader 250.

Marking 300 (e.g., for example including markings 300*a* through 300*h*) may be marked on container 110 via any suitable technique. For example as illustrated in FIGS. 4A and 4B, marking 300 may be disposed on (e.g., marked on or applied to) container 110 via a marking device 450. Marking device 450 may be a stamping device such as a mechanical stamping device. Marking device 450 may be any suitable stamping device such as, for example, a pre-inked or self-inking stamp. Marking device 450 may be a mechanical gear self-inking stamp. Marking device 450 may be a rubber stamp. Marking device 450 may be a mechanical or electronic (e.g., or hydraulic) stamping device. Marking device 450 may apply the exemplary disclosed marking material in a wet or partially wet (e.g., moist) state that may dry (e.g., may dry or cure) on container 110 after marking (e.g., or may be marked in a dry state). Marking device 450 may mark container 110 with marking material for example as described above (e.g., regarding the exemplary disclosed marking material). The exemplary disclosed marking device may be a marker 450*a* (e.g., a marking pen or marker) that may apply the exemplary disclosed marking material of marking 300 to container 110. Any desired exemplary disclosed edible or non-edible marking material (e.g., as described above) may be applied to container 110. Marking device 450 may for example apply marking material of marking 300 to an interior bottom surface of container 110. Marker 450*a* may be used (e.g., by a user) to apply marking material of marking 300 to any desired interior surface of container 110 (e.g., a bottom and/or sides, for example to draw markings 600*c* through 600*f* or 600*h*). A side marking device 450*b* may for example be used to apply marking material of marking 300 to an interior side surface (e.g., top, side, interior surface) of container 110 for example as illustrated in FIG. 5. Side marking device 450*b* may be any suitable side marking device such as, for example, a scissor-type or lever-type seal as illustrated in FIG. 5. Marking 300 may be applied via any other suitable technique such as, for example, an inkjet marking device (e.g., portable inkjet marker), a fiber laser marker, a handheld electronic printing device, a sprayer, and/or any other suitable device for applying marking material of marking 300.

Marking 300 may be formed from the exemplary disclosed edible or non-edible marking material that may be disposed on container 110 made (e.g., formed from) the exemplary disclosed edible or non-edible container material. For example, exemplary disclosed container 110 may be formed from either the exemplary disclosed non-edible container material on which marking 300 formed from the exemplary disclosed edible marking material may be disposed, the exemplary disclosed non-edible container material on which marking 300 formed from the exemplary disclosed non-edible marking material may be disposed, or the exemplary disclosed edible container material on which marking 300 formed from the exemplary disclosed edible marking material may be disposed. For example as illustrated in FIG. 4C, container 110 may be a cup formed from the exemplary disclosed non-edible or edible material on which the exemplary disclosed edible (e.g., or non-edible) marking material may be disposed. Also for example as illustrated in FIG. 7, a container 110*a* may be a bowl formed from the exemplary disclosed non-edible or edible material on which the exemplary disclosed edible marking material may be disposed. Also for example as illustrated in FIG. 8, a container 110*b* may be a cone formed from the exemplary disclosed edible material on which the exemplary disclosed edible marking material may be disposed (e.g., an edible cone including an edible marker). Any desired combination of edible or inedible container material and edible or inedible marking material may be used for respective desired applications for example as described herein.

Figure 9:
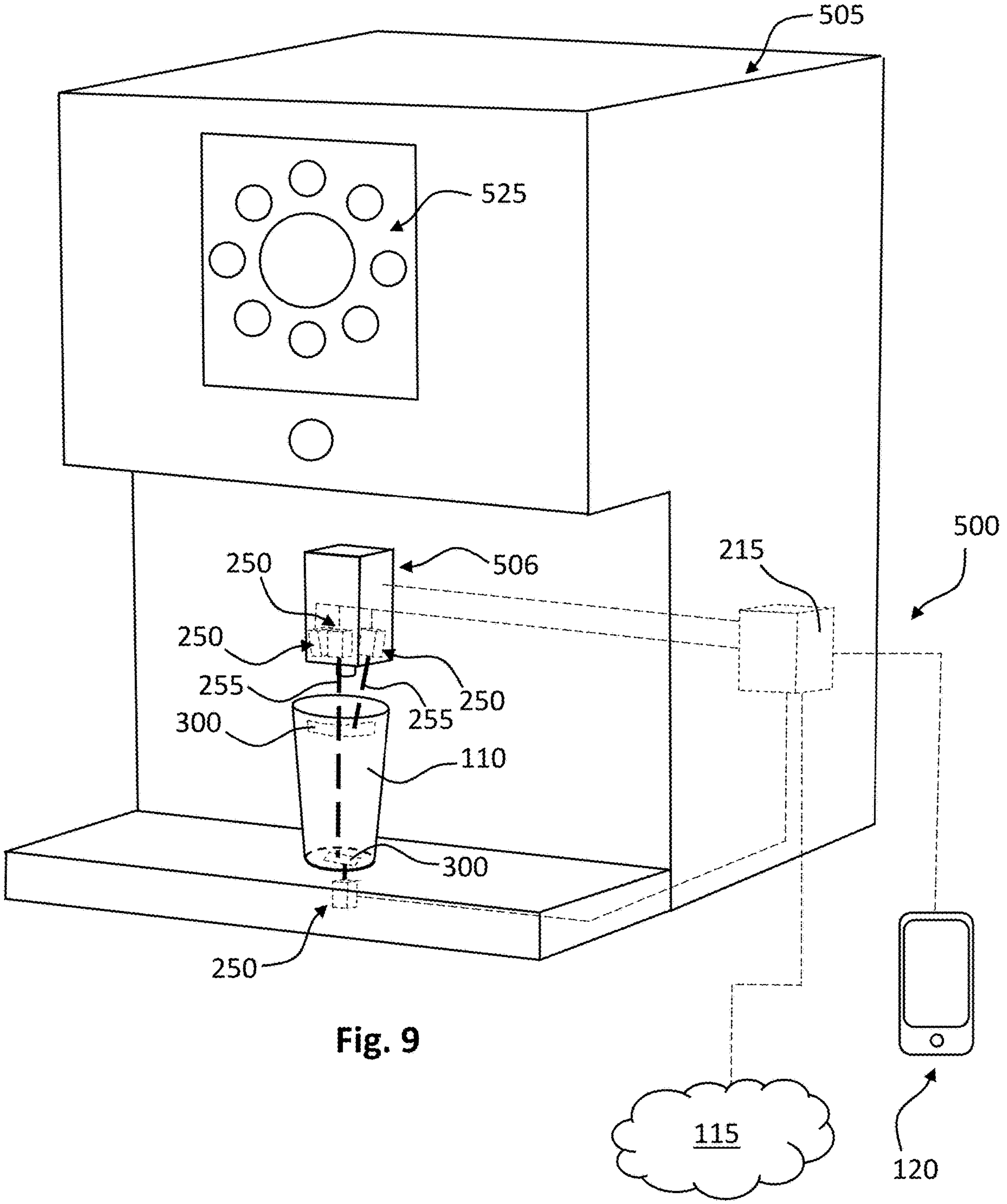
FIG. 9 is perspective view of at least some exemplary embodiments of the present invention.

FIG. 9 illustrates another exemplary embodiment of the exemplary disclosed system and apparatus. Dispensing system 500 including dispensing apparatus 505 may be generally similar to dispensing system 100 including dispensing apparatus 105 as described above. A dispenser 506 may be generally similar to dispenser 205 described above, and may also include an integrated ice dispenser similar to ice dispenser 210 described above. A user interface 525 may include components similar to user interface 225 described above. In at least some exemplary embodiments, user interface 525 may be a touchscreen (e.g., or any other exemplary disclosed user interface) for receiving user input and/or instructions for dispensing material 400 and/or ice 212 from dispenser 506 similar to for example as described above. User interface 525 may for example be used to select and control dispensing of different material 400 (e.g., different flavors of beverages such as different flavors of soda, and/or different types of material) from dispenser 506, for example as an alternative to having a plurality of different dispensers for dispensing different material 400. For example, user interface 525 may be used to select from many different types of edible or non-edible material 400 and/or different types (e.g., and/or flavors) of edible material 400 to be dispensed from dispenser 506 such as, for example, up to a dozen types, or up to hundreds of different types of material 400.

The exemplary disclosed system, apparatus, and method may be used in any suitable application for dispensing an edible or non-edible material in an edible or non-edible container. The exemplary disclosed system, apparatus, and method may be used in any suitable application for dispensing a material using a self-serve dispenser. For example, the exemplary disclosed system, apparatus, and method may be used in any suitable application for dispensing food using a self-serve dispenser. For example, the exemplary disclosed system, apparatus, and method may be used in any suitable application for dispensing a beverage using a self-serve dispenser.

Figure 10:
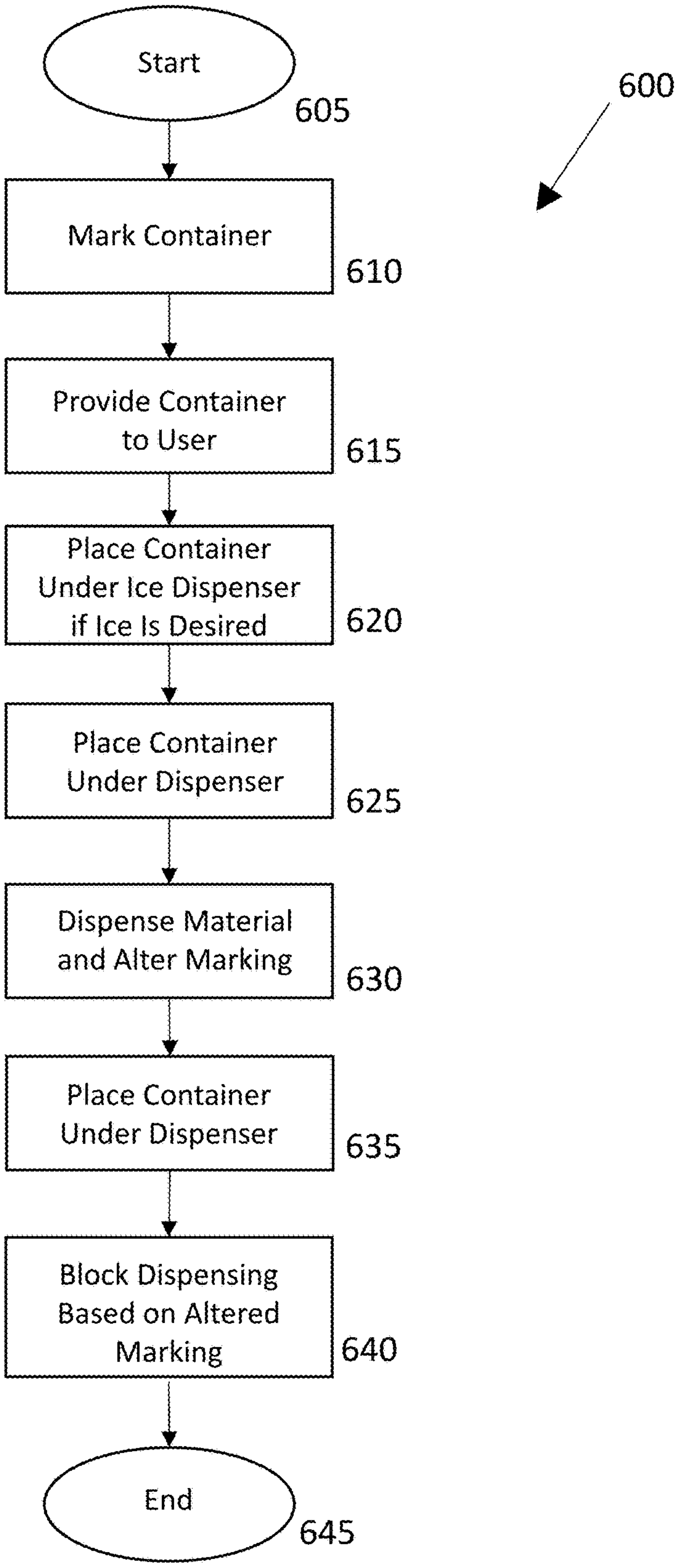
FIG. 10 illustrates an exemplary process of at least some exemplary embodiments of the present disclosure.

FIG. 10 illustrates an exemplary operation for using the exemplary disclosed dispensing system. Process 600 begins at step 605. At step 610, the exemplary disclosed container (e.g., container 110, 110*a*, or 110*b*) may be marked with the exemplary disclosed marking (e.g., marking 300, 300*a*, 300*b*, 300*c*, 300*d*, 300*e*, 300*f*, 300*g*, or 300*h*). For example, the exemplary disclosed marking may be applied as described above via marking device 450, marker 450*a*, side marking device 450*b*, and/or any other suitable marking technique.

At step 615, the exemplary disclosed container may be provided to a user such as a consumer. For example, the exemplary disclosed container may be provided to a user such as a purchaser at a point of sale (e.g., by an employee or owner of an enterprise providing material 400) or a dispensing control point (e.g., by a member of an organization providing material 400). For example, the exemplary disclosed container may be provided to a user by any operator or operators controlling dispensing of material 400 via the exemplary disclosed container for the applications as described herein. Also for example, the exemplary disclosed container may be purchased or obtained from a vending machine (e.g., via cash and/or user device 120) or any other suitable technique for distributing (e.g., controlled distribution) of the exemplary disclosed container. The exemplary disclosed container may be marked (e.g., already marked) with the exemplary disclosed marking for example as described above.

At step 620, for example for applicable applications when ice is desired, a user may place the exemplary disclosed container at ice dispenser 210. In at least some exemplary embodiments, electronic reader 250 at ice dispenser 210 may read, scan, and/or recognize the exemplary disclosed marking (e.g., marking 300, 300*a*, 300*b*, 300*c*, 300*d*, 300*e*, 300*f*, 300*g*, or 300*h*) marked on the exemplary disclosed container for example as described above. Based on electronic reader 250 reading, scanning, and/or recognizing the exemplary disclosed marking, controller 215 may control ice dispenser 210 to dispense ice 212. In at least some exemplary embodiments, ice dispenser 210 may dispense ice 212 freely without operation of electronic reader 250 (e.g., ice 212 may be dispensed freely regardless of the exemplary disclosed marking being read, scanned, and/or recognized). For example as described above, the exemplary disclosed marking may still be recognizable by electronic reader 250 below at step 630 after being affected by ice 212 at step 620. In at least some exemplary embodiments when ice is not desired, step 620 may be omitted.

At step 625, the exemplary disclosed container may be placed under the exemplary disclosed dispenser (e.g., dispenser 205 or dispenser 506) by the user (e.g., consumer of material 400) for dispensing material 400 for example as described above. In at least some exemplary embodiments, the exemplary disclosed container may be disposed on dispensing shelf 200 by the user.

At step 630, the exemplary disclosed dispensing apparatus (e.g., dispensing apparatus 105 or dispensing apparatus 505) may dispense material 400. Based on electronic reader 250 reading, scanning, and/or recognizing the exemplary disclosed marking, controller 215 may control the exemplary disclosed dispenser (e.g., dispenser 205 or dispenser 506) to dispense material 400 into the exemplary disclosed container, for example as described above. In at least some exemplary embodiments and for example as illustrated in FIG. 2, electronic reader 250 disposed at dispenser 205 (e.g., or dispenser 506) may emit beam 255 substantially vertically (e.g., downward) to read, scan, and/or recognize the exemplary disclosed marking that may be disposed at an interior bottom surface of the exemplary disclosed container. In at least some exemplary embodiments and for example also as illustrated in FIG. 2, electronic reader 250 disposed at dispensing shelf 200 may emit beam 255 substantially vertically (e.g., upward) through a bottom portion of the exemplary disclosed container that may be transparent (e.g., or translucent) to read, scan, and/or recognize the exemplary disclosed marking that may be disposed at an interior bottom surface of the exemplary disclosed container. In at least some exemplary embodiments and for example as illustrated in FIG. 3, electronic reader 250 disposed at dispenser 205 (e.g., or dispenser 506) at an angle relative to vertical may emit beam 255 at an angle (e.g., downward at an angle) to read, scan, and/or recognize the exemplary disclosed marking that may be disposed at an interior side surface of the exemplary disclosed container. The exemplary disclosed marker may also be read or recognized without emitting beam 255 (e.g., via camera or OCR or other suitable technique for example as described above).

In at least some exemplary embodiments, based on beam 255 contacting the exemplary disclosed marking (e.g., marking 300, 300*a*, 300*b*, 300*c*, 300*d*, 300*e*, 300*f*, 300*g*, or 300*h*) in an unaltered state, electronic reader 250 may read, scan, and/or recognize the exemplary disclosed marking, and may provide data and/or signals to controller 215 that the exemplary disclosed marking has been read, scanned, and/or recognized (e.g., and is accordingly determined to be in the unaltered state). Based on the data and/or signals indicating that the exemplary disclosed marking is in the unaltered state, controller 215 may read the marking (e.g., when the exemplary disclosed marking is a barcode or QR code) and/or recognize the marking (e.g., a shape, color, characters, and/or configuration of the exemplary disclosed marking). If the exemplary disclosed marking is determined to be in the unaltered state and to correspond to one of one or more predetermined configurations, then controller 215 may control the exemplary disclosed dispenser to dispense material 400. For example, if the exemplary disclosed marking is of a configuration that is authorized for allowing dispensing (e.g., based on stored data for example as described above), controller 215 may control the exemplary disclosed dispenser to dispense material 400. For example, controller 215 may control the exemplary disclosed dispenser to dispense material 400 into the exemplary disclosed container when the exemplary disclosed marking is: a marking 300*a* or 300*b* providing corresponding data to predetermined data stored in the exemplary disclosed memory of the exemplary disclosed system; is of a shape, color, texture (e.g., any of the exemplary disclosed characteristics described above) of markings 300*c*, 300*d*, 300*e*, 300*f*, 300*g*, and/or any other suitable shape stored in the exemplary disclosed memory of the exemplary disclosed system; contains characters matching predetermined characters (e.g., of marking 600*h*) stored in the exemplary disclosed memory of the exemplary disclosed system; and/or any other suitable characteristics or features of the exemplary disclosed marking corresponds to data stored in the exemplary disclosed memory of the exemplary disclosed system. As an illustrative example, if a heart shape similar to marking 300*d* having a red color is stored in the exemplary disclosed memory of the exemplary disclosed system and such a marking 300*d* is recognized by electronic reader 250, controller 215 may control the exemplary disclosed dispenser to dispense material 400 into the exemplary disclosed container (e.g., or if any of the other exemplary disclosed possibilities of configurations described herein corresponds to data stored in the exemplary disclosed memory of the exemplary disclosed system such as, for example, any desired data of a barcode, QR code, any desired shape, color, and/or 3D feature of a shape, any desired combination of characters, and/or any other configuration of the exemplary disclosed markings).

Also as an illustrative example, if a user on the user's own draws a shape of a certain color on the exemplary disclosed container and the marking does not match the predetermined data stored in the exemplary disclosed memory of the exemplary disclosed system, then controller 215 may control the exemplary disclosed dispenser to not dispense (e.g., block dispensing of) material 400. Accordingly for example, predetermined marking configurations of the exemplary disclosed marking may be changed (e.g., changed daily), may be made invisible to the human eye as described above, barcodes may be utilized, and/or any other suitable variations or impediments may be used to substantially prevent users from discovering, copying, and/or providing unauthorized markings to the exemplary disclosed containers to receive material 400. Controller 215 may also communicate data of unauthorized or incorrect markings to modules of the exemplary disclosed dispensing system so that suitable action may be taken (e.g., cameras at the exemplary disclosed dispensing apparatus may record images of the unauthorized user and use, an alarm may sound, and/or any other suitable action may be taken). In at least some exemplary embodiments in which material 400 is valuable (e.g., or hazardous), alarms may sound and/or any other suitable security measures may be activated based on unauthorized use.

In at least some exemplary embodiments, controller 215 may control the exemplary disclosed dispenser to dispense material 400 for a predetermined amount of time based on reading, scanning, and/or recognizing the exemplary disclosed marking in an unaltered state corresponding to an exemplary disclosed configuration stored in the exemplary disclosed memory of the exemplary disclosed system. For example, material 400 may be dispensed for a long enough period of time to fill the exemplary disclosed container to a desired level. For example, the exemplary disclosed dispenser may be continuously operated by the exemplary disclosed system without pause (e.g., and a user may be instructed to not touch the container until dispensing is complete). Also for example, dispensing may be authorized for a predetermined period of time to allow a user a window of time to fill the exemplary disclosed container using the exemplary disclosed dispenser. Also for example (e.g., when the exemplary disclosed dispenser has a mechanical member 230), controller 215 may control the exemplary disclosed dispenser to unlock mechanical member 230 to allow dispensing for a predetermined amount of time.

For example in at least some exemplary embodiments, controller 215 may control the exemplary disclosed dispenser to dispense material 400 for a predetermined amount of time based on reading, scanning, and/or recognizing the exemplary disclosed marking in an unaltered state corresponding to an exemplary disclosed configuration stored in the exemplary disclosed memory of the exemplary disclosed system, once the exemplary disclosed container is placed on dispensing shelf 200 and a user's hand is detected by electronic reader 250 (e.g., or any other suitable sensor at dispensing shelf 200) as being removed from the exemplary disclosed container. Controller 215 may also control the exemplary disclosed dispenser to stop dispensing if a user's hand and/or any other object is detected near the exemplary disclosed container during an authorized dispensing period or stage (e.g., to stop unauthorized refills due to switching a container with a valid marking to an unauthorized container, and then trying to reuse that valid marking again). Controller 215 may control an audio device of the exemplary disclosed dispensing apparatus to emit instructions or warnings to a user to facilitate efficient operation (e.g., including audio instructions such as "please remove hand from container," "please wait for dispensing to complete before removing cup," "please wait until the container is full before removing the container," and/or any other suitable audio instructions). Similar instructions may also be displayed on the exemplary disclosed user interface. Efficient dispensing may also be aided by repeated use by users, who will understand after repeated use that the exemplary disclosed container is not to be removed until a continuous dispensing time period (e.g., 10 seconds or any other suitable time period to fill the exemplary disclosed container) has elapsed.

Any other suitable steps may be used to facilitate dispensing of material 400 for a desired time and/or amount once dispensing is allowed as set forth above. For example, alternative to controlling the exemplary disclosed dispenser based on time, a predetermined amount of volume of material 400 may be controlled to be dispensed from the exemplary disclosed dispenser (e.g., or a plurality of dispensers) based on control of the exemplary disclosed dispenser by controller 215.

In at least some exemplary embodiments, controller 215 may vary a dispensing amount and/or dispensing time of material 400 from the exemplary disclosed dispenser based on the configuration of the exemplary disclosed marking. For example, a certain configuration (e.g., shape) and/or data (e.g., of the exemplary disclosed QR code, barcode, and/or characters) may provide data to controller 215 of a size of the exemplary disclosed container. For example, based on a configuration of the exemplary disclosed marking, controller 215 may ascertain dimensions and/or capacity of a given container (e.g., based on stored data for example as described above), and may control dispensing of a corresponding amount of material 400 to fill that container.

When material 400 contacts the exemplary disclosed marking (e.g., marking 300, 300*a*, 300*b*, 300*c*, 300*d*, 300*e*, 300*f*, 300*g*, or 300*h*) during dispensing, material 400 alters the exemplary disclosed marking as described above (e.g., material 400 erases, disturbs, marrs, and/or dissolves the exemplary disclosed marking). Controller 215 may control dispensing so that material 400 is filled to a level of the exemplary disclosed container that contacts and alters the exemplary disclosed marking. Accordingly, dispensing of material 400 into the exemplary disclosed container may result in the exemplary disclosed marking being altered based on the act itself of using the exemplary disclosed container to contain material 400. The exemplary disclosed container (e.g., container 110, container 110*a*, or container 110*b*) may thereby serve as a one-time use container for a given user. The exemplary disclosed container may be reused if desired based on collection, cleaning, and remarking of the exemplary disclosed container at step 610 after use by a user (e.g., also for example the exemplary disclosed container may become waste or recycled after one-time use).

At step 635, a user may attempt to reuse the exemplary disclosed container after filling it with material 400 (e.g., attempt unauthorized reuse). For example, the user may consume some or all of material 400 and then attempt to partially or substantially entirely refill the exemplary disclosed container (e.g., or give the container to another user for similar reuse). The user may place the used container at the exemplary disclosed dispenser as described above regarding step 625.

At step 640, controller 215 may operate to control electronic reader 250 to attempt to read, scan, and/or recognize an exemplary disclosed marking as described above regarding step 630. Because the exemplary disclosed marking is altered (e.g., including being erased, disturbed, marred, and/or dissolved by material 400), controller 215 may determine that no recognizable, readable, or scannable marking is marked on the exemplary container based on operation of electronic reader 250. In at least some exemplary embodiments, because electronic reader 250 may not operate until a user's hand is removed from the exemplary disclosed container (e.g., and/or while a user's hand is disposed at or near the exemplary disclosed container) as described above, a user may not have an opportunity to attempt to use a valid marking to initiate dispensing and then try to replace that container with a used container (e.g., thereby stopping attempts to reuse that same marking repeatedly to fill other containers). Controller 215 may control the exemplary disclosed dispenser to not dispense (e.g., block dispensing) of material 400 when electronic reader 250 cannot scan, read, or recognize an exemplary disclosed marking. For example, controller 215 may control components of the exemplary disclosed dispenser (e.g., valves, actuators, pumps, mechanical member 230, and/or any other suitable component) to lock, remain inactive, and/or not operate so that substantially no material 400 is dispensed. Controller 215 may also activate security measures (e.g., alarms, imaging, and/or notifications) using similar techniques for example as described above regarding step 630. The exemplary disclosed container may thereby be maintained as a one-time use container allowing for no refills (e.g., unless collected and remarked). Process 600 may end at step 645.

The invention includes other illustrative embodiments ("Embodiments") as follows.

Embodiment 1: A method, comprising: disposing a marking on an interior surface of a container; reading the marking using an electronic reader; dispensing a material into the container after the electronic reader reads the marking; and altering the marking, by dispensing the material into the container, so that the marking is unreadable by the electronic reader.

Embodiment 2: The method of Embodiment 1, wherein the marking is an edible marking and the material is food.

Embodiment 3: The method of Embodiment 1, wherein the marking is disposed on a bottom interior surface of the container and the electronic reader reads the marking through a bottom of the container.

Embodiment 4: The method of Embodiment 1, wherein the marking is disposed on a bottom interior surface of the container, and the marking is disposed between a bottom of the container and the electronic reader when the electronic reader reads the marking.

Embodiment 5: The method of Embodiment 1, wherein the marking is disposed on a side interior surface of the container.

Embodiment 6: The method of Embodiment 1, further comprising dispensing ice into the container before the electronic reader reads the marking.

Embodiment 7: The method of Embodiment 1, wherein dispensing the material into the container occurs immediately after the electronic reader reads the marking.

Embodiment 8: The method of Embodiment 1, wherein the marking is an edible marking that is at least one selected from the group of a QR code, a barcode, a shape formed from solid lines, a shape formed from dots or dashes, and combinations thereof.

Embodiment 9: The method of Embodiment 1, wherein the marking is invisible to the human eye.

Embodiment 10: The method of Embodiment 1, wherein the container is edible.

Embodiment 11: The method of Embodiment 1, wherein the marking is an edible marking and disposing the edible marking on the interior surface of the container, which is a food container, includes stamping the interior surface with the edible marking using a marking device.

Embodiment 12: The method of Embodiment 1, further comprising stopping dispensing of the material into the container when a predetermined period of time elapses.

Embodiment 13: The method of Embodiment 1, wherein the material is food that is at least one selected from the group of a beverage, ice cream, yogurt, custard, pudding, soup, and combinations thereof.

Embodiment 14: An apparatus for controlling dispensing a food from a food dispenser into a food container having an edible marking disposed on an interior surface of the food container, comprising: an electronic reader configured to read the edible marking; and a controller configured to control the electronic reader; control the food dispenser to dispense the food into the food container after the electronic reader reads the edible marking; control the food dispenser to stop dispensing of the food when a predetermined period of time elapses after the electronic reader reads the edible marking; and block the food dispenser from dispensing the food outside of the predetermined period.

Embodiment 15: The apparatus of Embodiment 14, wherein the electronic reader is at least one selected from the group of a QR code scanner, a barcode scanner, an image recognition device, and combinations thereof.

Embodiment 16: The apparatus of Embodiment 14, further comprising a marking device configured to mark the edible marking on the interior surface of the food container.

Embodiment 17: A beverage fountain for dispensing a beverage into a beverage container having an edible marking disposed on an interior surface of the beverage container, comprising: a beverage dispenser; an electronic reader configured to read the edible marking; and a controller configured to control the electronic reader; and control the beverage dispenser to dispense the beverage into the beverage container after the electronic reader reads the edible marking; wherein dispensing the beverage into the beverage container alters the edible marking so that the edible marking is unreadable by the electronic reader.

Embodiment 18: The beverage fountain of Embodiment 17, further comprising a mechanical stamper configured to stamp the edible marking on the interior surface of the beverage container.

Embodiment 19: The beverage fountain of Embodiment 17, wherein the electronic reader is at least one selected from the group of a QR code scanner, a barcode scanner, an image recognition device, and combinations thereof.

Embodiment 20: The beverage fountain of Embodiment 17, wherein the beverage is at least one selected from the group of a soft drink, beer, wine, sparkling wine, a distilled alcoholic beverage, a mixed alcoholic beverage, a frozen beverage, a coffee beverage, a milkshake, juice, lemonade, milk, tea, hot chocolate, coconut water, an energy drink, sparkling water, and combinations thereof.

In at least some exemplary embodiments, the exemplary disclosed system, apparatus, and method may provide an efficient and effective technique for allowing and maintaining a single use of a purchased food container from a self-serve dispenser. The exemplary disclosed system, apparatus, and method may prevent free refills and/or excessive reuse of a single purchased food container by one or more end users, thereby decreasing an amount of unpaid food that is obtained from a self-serve dispenser. The exemplary disclosed system, apparatus, and method may also prevent dispensing of excessive amounts of unhealthy foods such as sugary food, caloric food, and/or other unhealthy food types. The exemplary disclosed system, apparatus, and method may also prevent free refills and/or excessive reuse of a single purchased food container without food providers resorting to monitoring and enforcement of food dispensing rules that often involve time, effort, monetary burden, employee stress, and/or confrontational situations.

It will be apparent to those skilled in the art that various modifications and variations can be made to the exemplary disclosed system, apparatus, and method. Other embodiments will be apparent to those skilled in the art from consideration of the specification and practice of the exemplary disclosed system, apparatus, and method. It is intended that the specification and examples be considered as exemplary, with a true scope being indicated by the following claims.

What is claimed is:

1. A beverage fountain for dispensing a beverage into a beverage container having an edible marking disposed on an interior surface of the beverage container, comprising:

a beverage dispenser;

an electronic reader configured to read the edible marking; and a controller configured to control the electronic reader; and control the beverage dispenser to dispense the beverage into the beverage container after the electronic reader reads the edible marking;

wherein dispensing the beverage into the beverage container alters the edible marking, by the beverage physically contacting the edible marking, so that the edible marking is unreadable by the electronic reader.

2. The beverage fountain of claim 1, further comprising a mechanical stamper configured to stamp the edible marking on the interior surface of the beverage container, wherein the beverage container is inedible.

3. The beverage fountain of claim 1, wherein the electronic reader is at least one selected from the group of a QR code scanner, a barcode scanner, an image recognition device, and combinations thereof.

4. The beverage fountain of claim 1, wherein the beverage is at least one selected from the group of a soft drink, beer, wine, sparkling wine, a distilled alcoholic beverage, a mixed alcoholic beverage, a frozen beverage, a coffee beverage, a milkshake, juice, lemonade, milk, tea, hot chocolate, coconut water, an energy drink, sparkling water, and combinations thereof.

5. A method, comprising:

disposing a marking on an interior surface of a container;

reading the marking using an electronic reader;

dispensing a material into the container after the electronic reader reads the marking; and altering the marking, by dispensing the material into the container so that the material physically contacts the marking, so that the marking is made unreadable by the electronic reader.

6. The method of claim 5, wherein the marking is an edible marking, the material is food, and the container is inedible.

7. The method of claim 5, wherein the marking is disposed on a bottom interior surface of the container and the electronic reader reads the marking through a bottom of the container.

8. The method of claim 5, wherein the marking is disposed on a bottom interior surface of the container, and the marking is disposed between a bottom of the container and the electronic reader when the electronic reader reads the marking.

9. The method of claim 5, wherein the marking is disposed on a side interior surface of the container.

10. The method of claim 5, wherein dispensing the material into the container occurs immediately after the electronic reader reads the marking.

11. The method of claim 5, wherein the marking is an edible marking that is at least one selected from the group of a QR code, a barcode, a shape formed from solid lines, a shape formed from dots or dashes, and combinations thereof.

12. The method of claim 5, wherein the marking is invisible to the human eye.

13. The method of claim 5, wherein the container is edible.

14. The method of claim 5, wherein the marking is an edible marking and disposing the edible marking on the interior surface of the container, which is a food container, includes stamping the interior surface with the edible marking using a marking device.

15. The method of claim 5, further comprising stopping dispensing of the material into the container when a predetermined period of time elapses.

16. The method of claim 5, wherein the material is food that is at least one selected from the group of a beverage, ice cream, yogurt, custard, pudding, soup, and combinations thereof.

17. The method of claim 5, wherein the marking is an edible marking.

* * * * *